(12) United States Patent
Thomson et al.

(10) Patent No.: US 6,691,186 B2
(45) Date of Patent: Feb. 10, 2004

(54) DUAL SEQUENCER BASED DISK FORMATTER

(75) Inventors: Steven E. Thomson, Lafayette, CO (US); Brian Wilson, Louisville, CO (US)

(73) Assignee: Texas Instruments Incorporated, Dallas, TX (US)

( * ) Notice: Subject to any disclaimer, the term of this patent is extended or adjusted under 35 U.S.C. 154(b) by 287 days.

(21) Appl. No.: 09/973,159

(22) Filed: Oct. 9, 2001

(65) Prior Publication Data

US 2003/0067699 A1 Apr. 10, 2003

(51) Int. Cl.[7] .............................................. G06F 13/00
(52) U.S. Cl. .......................... 710/58; 710/60; 710/61; 710/69; 710/74
(58) Field of Search ........................... 710/58, 60, 61, 710/69, 74

(56) References Cited

U.S. PATENT DOCUMENTS

| | | | | |
|---|---|---|---|---|
| 5,465,343 A | * | 11/1995 | Henson et al. | 711/112 |
| 5,596,737 A | | 1/1997 | Strang, Jr. | |
| 5,603,066 A | | 2/1997 | Krakirian | |
| 5,768,617 A | * | 6/1998 | Liu | 710/5 |
| 5,937,167 A | * | 8/1999 | Arimilli et al. | 709/223 |
| 5,943,682 A | | 8/1999 | Park et al. | |
| 5,946,706 A | | 8/1999 | Park et al. | |

* cited by examiner

*Primary Examiner*—Jeffrey Gaffin
*Assistant Examiner*—Mohammad O. Farooq
(74) *Attorney, Agent, or Firm*—W. Daniel Swayze, Jr.; W. James Brady; Frederick J. Telecky, Jr.

(57) ABSTRACT

The present invention provides for a dual sequencer for use in a peripheral storage device system, as well as a new protocol for data retrieval/storage in peripheral storage device systems. The system provides for more efficient media storage/retrieval and addresses the issue of channel latencies in media storage/retrieval systems.

12 Claims, 16 Drawing Sheets

DUAL SEQUENCER BASED DISK FORMATTER

TECHNICAL FIELD

The present invention relates to peripheral storage devices and, more particularly, to hard drive disk control systems used in peripheral storage devices.

BACKGROUND OF THE INVENTION

Hard disk drives and other peripheral storage devices have become a standard feature in most computer systems. Such devices provide mass storage functionality for a host computer, and may include hard disk drives, CDROM drives, tape drives, optical disk memory devices, floppy disk drives, and the like. For example, hard disk drives include one or more magnetically coated platters used for storing program instructions, data, and other information used by the computer system. For example, as illustrated in prior art FIG. 1, one or more such platters may be configured in a stack 2 for rotation about a spindle platter 7 by a spindle or servo motor 3. A space is provided between each platter to allow an arm 4 having a read/write head 5 to be positioned on each side of each platter such that information may be stored and retrieved.

The read/write heads 5 may be mounted onto one or more suspension arms 4, whereby each of the read/write heads 5 may be positioned as desired. The suspension arms may be coupled together at a voice coil motor (VCM) 6 to form one unit or assembly that is positioned by the voice coil motor 6. The voice coil motor 6 positions the suspension arms 4 so that an active read/write head 5 is properly positioned for reading or writing information. The read/write heads may thus be positioned between an inner diameter and an outer diameter of the platters in a controlled fashion to access data stored thereon.

Hard disk drives and other types of peripheral storage devices also include a variety of electronic control circuitry for processing data and for controlling its overall operation. For example, the circuitry may include a pre-amplifier (typically mounted on the suspension arm 4 local to the read/write head), a read channel circuit 8, a motor control circuit 9, a disk formatter circuit 10, an error checking circuit 11, and a variety of disk control circuitry to control the operation of the hard disk drive and to properly interface the hard disk drive system to a bus 13 in a host computer system (not shown). The disk drive may further comprise some form of buffer memory 14 to buffer or temporarily store information as it is processed from the host system to the storage media (platters) 1 and/or from the media 1 to the host system. In addition, the control circuitry may include instruction memory (e.g., ROM, EEPROM, FLASH, or the like) used for storing firmware instructions for execution by the controller processor, and execution memory (e.g., SRAM) used for storing temporary variables, intermediate results, and the like (scratchpad, not shown).

The disk control circuitry generally includes a processor (e.g., a DSP, microprocessor, microcontroller, or the like) for executing instructions stored in memory to control the operation and interface of the hard disk drive. Within this is circuitry, there exist a functional block of logic commonly known as a disk formatter 10. This disk formatter 10 performs both data path and control path operations. Its primary duty is to receive timing information from its inputs and then control the sequence of read or write operations. In addition it controls the length, or amount, of read/write operations allowed on the media. Its inputs are typically a sub servo subsystem (the motor control circuit 9), the error checking system 11, the buffer manager 14 (which interfaces with the host computer via an interface (not shown)) and the read channel logic 8 which retrieves/stores the read/write data from/to the storage medium.

Hard disk drives and other peripheral storage devices perform write, read, and servo operations when storing and retrieving data. Generally, a write operation includes receiving data from the system bus 13 and storing the data on the platters. The data on the platters is typically organized into circumferential tracks 21 with the data grouped along the tracks 21 in sectors 20, as illustrated in prior art FIG. 2. Accordingly, in a write operation, the data is transferred to the disk 22 in sectors 20. In a read operation, the appropriate sector 20 to be read is located and data that has been previously written thereto is read. The data is then provided to the host computer system via the system bus 13.

Peripheral storage devices, such as disk drive products are desired for a variety of different applications, each having different performance requirements. As the performance in the host computers improve, there exists a demand for larger data storage systems, faster hard drive data retrieval times, greater accuracy in data retrieval and increased data retrieval efficiencies. This is due, in part, to the software designer's expectations and requirements for improved graphics, etc.

As the storage media capabilities increase, the various problems associated with these medias are amplified. One such problem is a phenomenon, called channel latencies, which can cause data retrieval delays and wasted data storage space due to inefficient media space utilization. Previously, this problem could be ignored since the wasted data storage space due to channel latencies was relatively small compared to data storage capacities. However, with the ever increasing data storage capacities and their subsequent data transfers present in today's present computers, these channel latencies are becoming a more significant issue.

It should be noted that past channel latencies could be measured in terms of byte times on the order of 10 byte times (a byte time refers to the number of periods transpired by the clock which synchronizes the interface between the disk formatter and the read channel). Due to the increasing complexities and functionality of the read channel circuitry, present latencies are on the order of 10 to 70 byte times and future latencies are expected to be on the order of 3000 or greater byte times. It is anticipated that future latencies will be measured in sector times (approximately 800 bytes), resulting in a greater amount of wasted media storage space. In other words, with increased scale of data retrieval operations, it becomes rather evident that a solution to media storage channel latencies is necessary.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its primary purpose is to present some concepts of the invention in a simplified form as a prelude to the more detailed description that is presented later.

The present invention utilizes a dual sequencer in the disk formatter of hard drive circuitry. By using two sequencers, the tasks of handling the control signal timing and the data transfer signals are isolated from one another. Using this approach, the disk formatter can accommodate channel latencies of virtually any size without a substantial loss in data storage efficiency.

The dual sequencer of the present invention employs one sequencer, called a channel sequencer, which is tied to the timing of the data media and controls the read gate signals and the write gate signals (the control path). A second sequencer, called a NRZ sequencer, dictates the timing of the data as it is presented on a data transfer bus, called a NRZ bus (the data path). In other words one sequencer signals the circuitry when data is to be written or read from the media (the read or write gate signals), the other sequencer verifies that the data to be transferred is indeed valid data. Since the sequencers operate independently of one another in terms of time, the system employing the dual sequencer architecture can accommodate a channel latency of any size, including multiple sector times without a substantial negative impact on data storage efficiency on the media.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The invention comprises a universal, multi-function peripheral storage device system that utilizes a dual sequencer logic circuit which decouples the data path and control path signals from one another to eliminate wasted disk storage space and minimize data retrieval times to (and from) the data storage medium.

Figure 3:
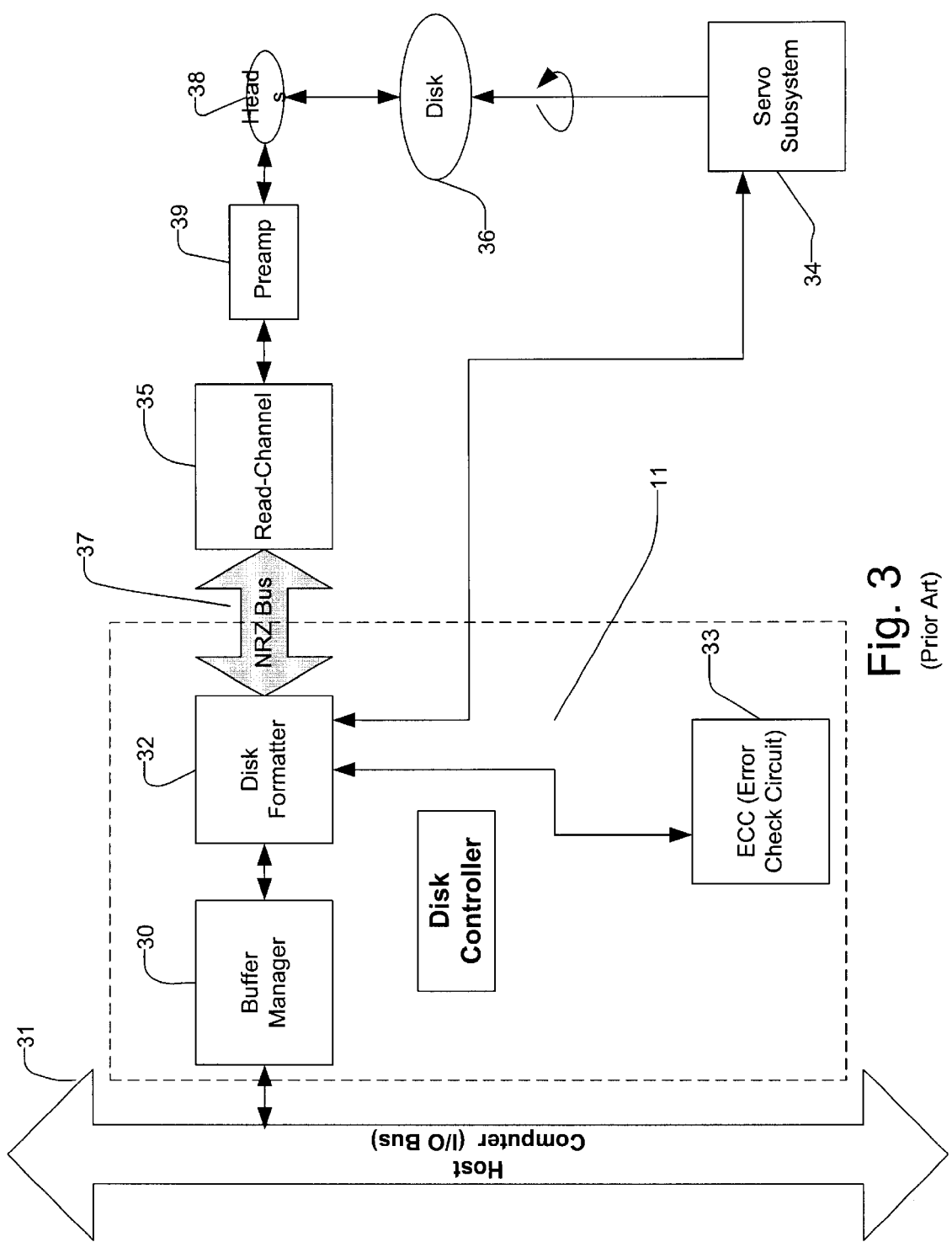
FIG. 3 is a block diagram illustrating the relationships between the different sections of a typical hard drive.

In order to provide context for the invention, a brief discussion of a conventional disk formatter architecture will be discussed. FIG. 3 illustrates a typical relationship of a disk formatter to the other functional elements in a hard drive disk system. A buffer manager 30 (sometimes called a disk cache) receives instructions from the host computer I/O bus 31, and stores/accesses the most recently utilized data and data instructions. When a program calls for data, the system checks the buffer manager 30 first to see if the data is present, and if the data is present the system will use this data first. This type of action improves the overall computer system's performance dramatically. If the data is not present in the buffer manager 30, then the disk formatter 32 is accessed. The disk formatter 32 is a functional block of logic that interfaces with other functional blocks such as the error correcting circuit 33, the servo subsystem 34 and the read channel 35.

When the disk formatter 32 receives instructions from the buffer manager 30 the disk formatter sends a signal to the error correcting circuit 33, which in turn, provides a data validation signal back to the disk formatter 32, thus ensuring that the data was transmitted/received correctly. The disk formatter 32 also receives a signal from the servo subsystem 34, which provides timing information (e.g., informs the disk formatter 32 that the data is ready to be pulled off the disk 36, for read operations, or placed on the disk 36, for write operations).

Once the logic of the disk formatter 32 is satisfied, the disk formatter 32 sends a signal to the read-channel 35 via an NRZ bus 37. The read-channel 35 then either energizes, or de-energizes the read/write heads 38, via a preamp 39. For read operations, the read/write head 38 is de-energized and magnetic bits on the disk 36 induce a current at the head 38, which generates a signal, which then is received and amplified by the preamp 39. For write operations, the read/write head 38 is energized and the read/write head 38 then deposits magnetic bits of information onto the disk 36. From the above description it is easy to see that the disk formatter 32 performs both control path and the data path functions. In other words it determines the amount, or length, of the data to be transferred and the timing of when the data is to be read/written (the control path). It then determines the validity of the data prior to the transfer (data path).

Conventional disk formatters have used either a state machine or a sequencer based approach to manage the control and data path operations. Due primarily to the nature of read-channel devices, a single sequencer is employed conventionally to control both the timing of the control signals (control path) and the transfer of data (data path) via the NRZ bus 37. Since a single sequencer traditionally is used to control both functions, these functions have been inseparably linked with respect to when they occur and the time duration in which they occur. This concept is illustrated via the waveforms of FIG. 4, which illustrate a typical timing relationship between the control path and data path signals, and is now briefly described.

Figure 4:
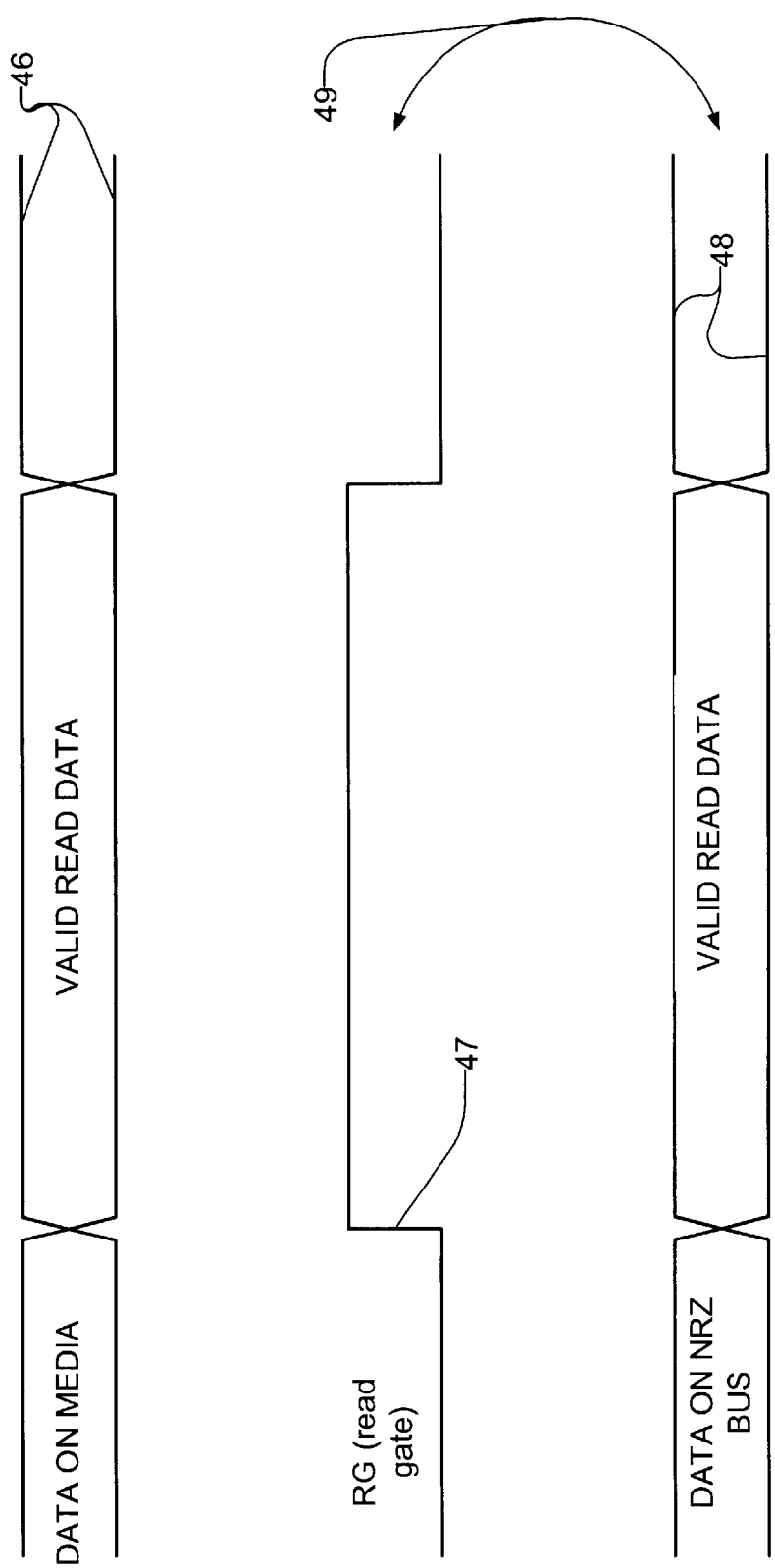
FIG. 4 is a schematic diagram illustrating a timing relationship between control path and data path signal waveforms for read operations used in prior art architectures.

Typical (prior art) read operations commence with waveforms similar to that illustrated in FIG. 4. When data is required to be processed 46, a read gate (RG) signal 47 is generated by the disk formatter logic; this signal verifies that the read/write head is in a position to retrieve data off the disk and how much data is to be retrieved (the read gate signal tells the logic when to access the data and how long to access the data via its signal duration). In addition, data that is being sent from the media 46 to the NRZ bus 48 through the read channel 35 is validated by the disk formatter logic (e.g., the data is compared to the ECC and buffer logic to ensure it is valid data). The read gate signal 47 and the data validation signal 48 have their timing tied together 49 due to the use of a single sequencer. It should be noted that even though the read gate signal 47 and the data validation signal 48 start substantially concurrently, this data transfer operation has an inherent time delay. A cause of this delay is due to the read channel 35 operations which must verify the data before the read channel 35 will transfer the data from the media 46 to the NRZ 48 bus for processing. This delay is defined as read latency and is discussed in detail below.

A read latency is defined as the time difference between when encoded data passes through the read head as the data is pulled from the media, until the time data is presented as valid data on the NRZ bus interface to the disk formatter. As shown in the waveforms contained in FIG. 5, a single sequencer, state machine or similar device, is used conventionally to control both the timing of the read gate signal 60, and the data validation signal 61 presented on the NRZ bus. Both of these signals use the same sequencer and the sequencer has to first activate the read gate signal 60 at a time appropriate to the location of the read head over the media 62 (note, these signals 60 and 61 have their timing tied together 65). The disk formatter then has to wait for the read channel circuitry to validate the data, which causes a time delay 63. This delay in read operations is defined as a channel read latency 63. It should also be noted that because the read gate signal 60 and the data path signal 61 are tied together, the read gate signal 60 must stay high until all the valid data has been presented on the NRZ bus. Further, because the next data sector transfer cannot occur until the read gate signal 60 goes low so that it can be reasserted at time 66, data cannot be read from a portion 64 of the media, thus resulting in wasted space thereon.

Figure 6:
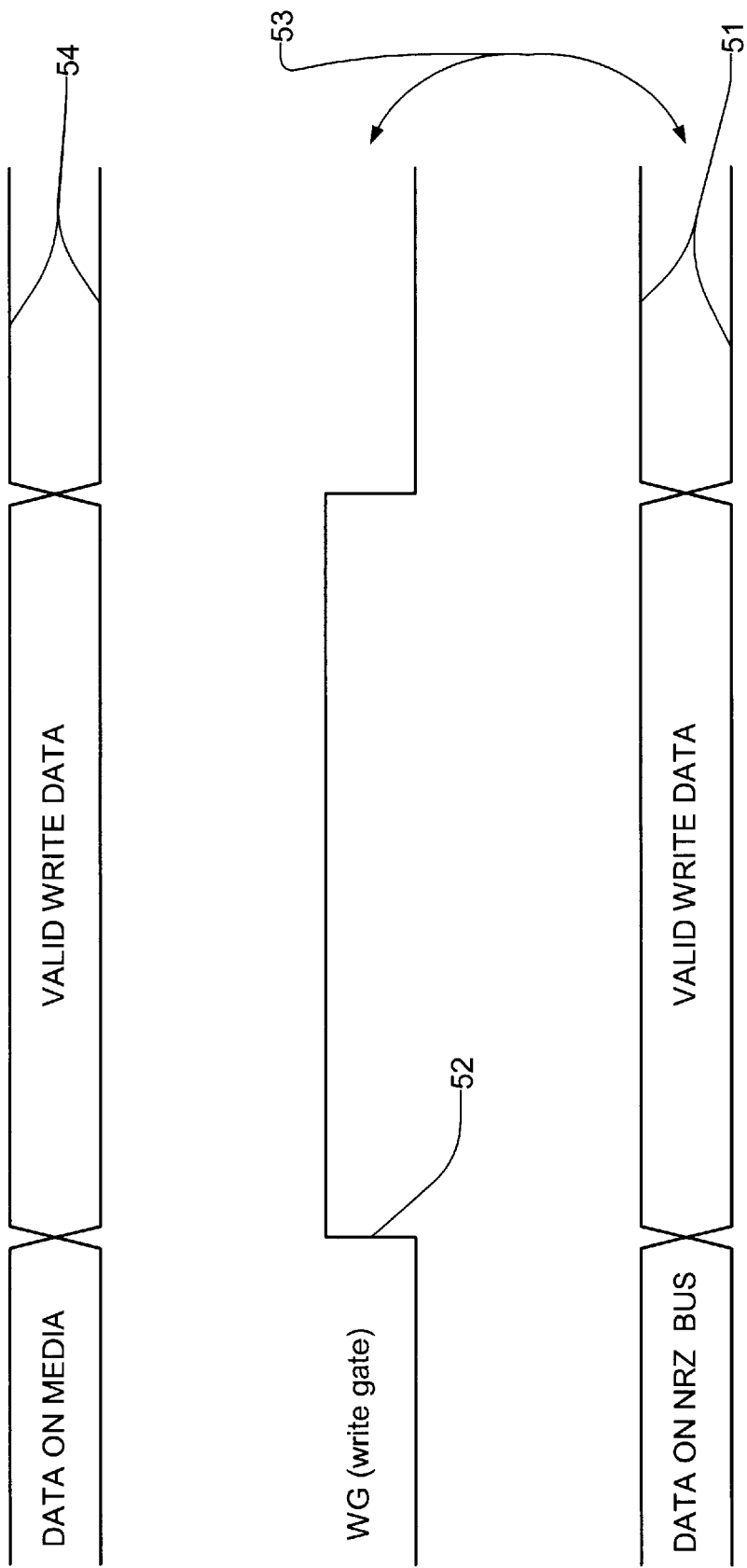
FIG. 6 is a schematic diagram illustrating a timing relationship between control path and data path signal waveforms for write operations used in prior architectures.

Typical write operations commence with a waveform similar to that illustrated in FIG. 6. When a data write operation is required and the data 51 is ready to be processed, a write gate (WG) signal 52 is generated by the disk formatter logic; These signals have their timing tied together due to the use of a single sequencer 53, however, even though they start and end simultaneously the data transfer operation has an inherent time delay. A cause of this delay is due to the read channel 35, which must verify that the media 54 is ready to receive the data from the NRZ bus 51. This delay is defined as a write latency and is discussed in detail below.

Figure 7:
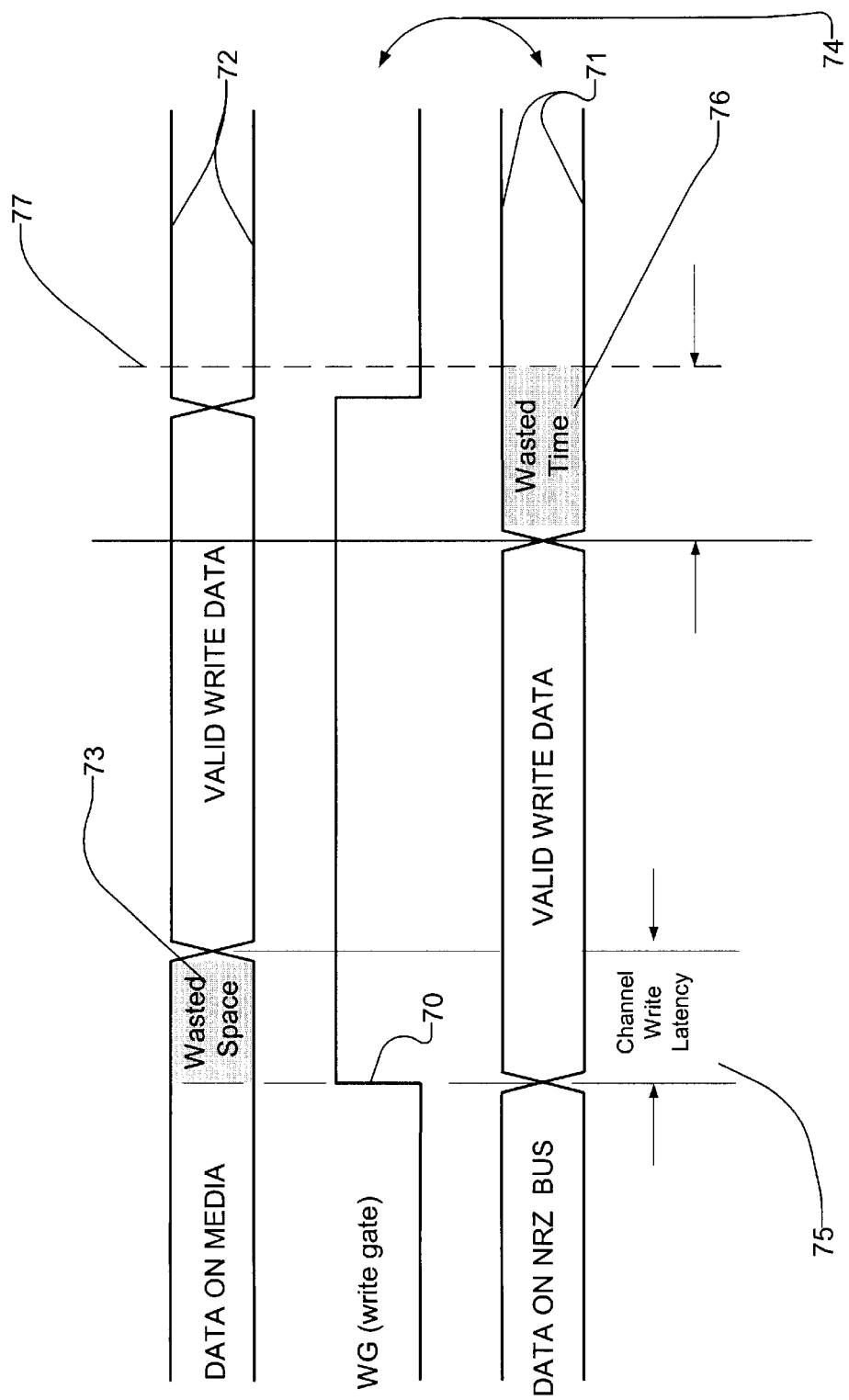
FIG. 7 is a schematic diagram illustrating how the timing relationship between the control path and the data path signal waveforms for write operations used in prior art, caused wasted space and time due to channel latencies.

A write latency is defined as the time difference between when valid NRZ data is presented to the read channel on the NRZ bus, until the encoded data is written onto the media. As shown in the waveforms contained in FIG. 7, a single sequencer, state machine or similar device, is used to control both the timing of the write gate signal 70, and the timing of the data transfer 71 over the NRZ bus. Both of these signals use the same sequencer and this sequencer has to activate the write gate signal 70 at a time when valid write data is presented on the NRZ bus 71 (note, these signals have their timing tied together 74). This data 71 cannot be stored (or written) until the data is encoded by the read channel, thus allowing for wasted storage space 73. The time spent waiting for the data to be ready for transfer to the media is defined as a channel write latency 75. After data is transferred from the NRZ 71 bus to the media 72, the system must wait 77 (to clear the write gate) until all the data completes transfer to the media before the write gate signal 70 can go low, thus resulting in wasted time 76. The system cannot begin the next sector transfer until both the write gate 70 and NRZ bus data 71 signals are cleared. This process cannot occur prior to the time period 77.

To summarize, the actual data transfer of conventional single sequencer architectures is delayed due to the verification process (data path) being tied to the data acquiring process (control path). In the past, prior art systems could ignore such channel latencies because the read channel functions were more simple and thus not long, resulting in about 1% wasted media space; however, with next generation read channels employing greater functionally such as iterative coding and decoding for error corrections, etc., it is clear that such channel latencies should no longer be ignored during the stages of data retrieval or transmission.

Figure 5:
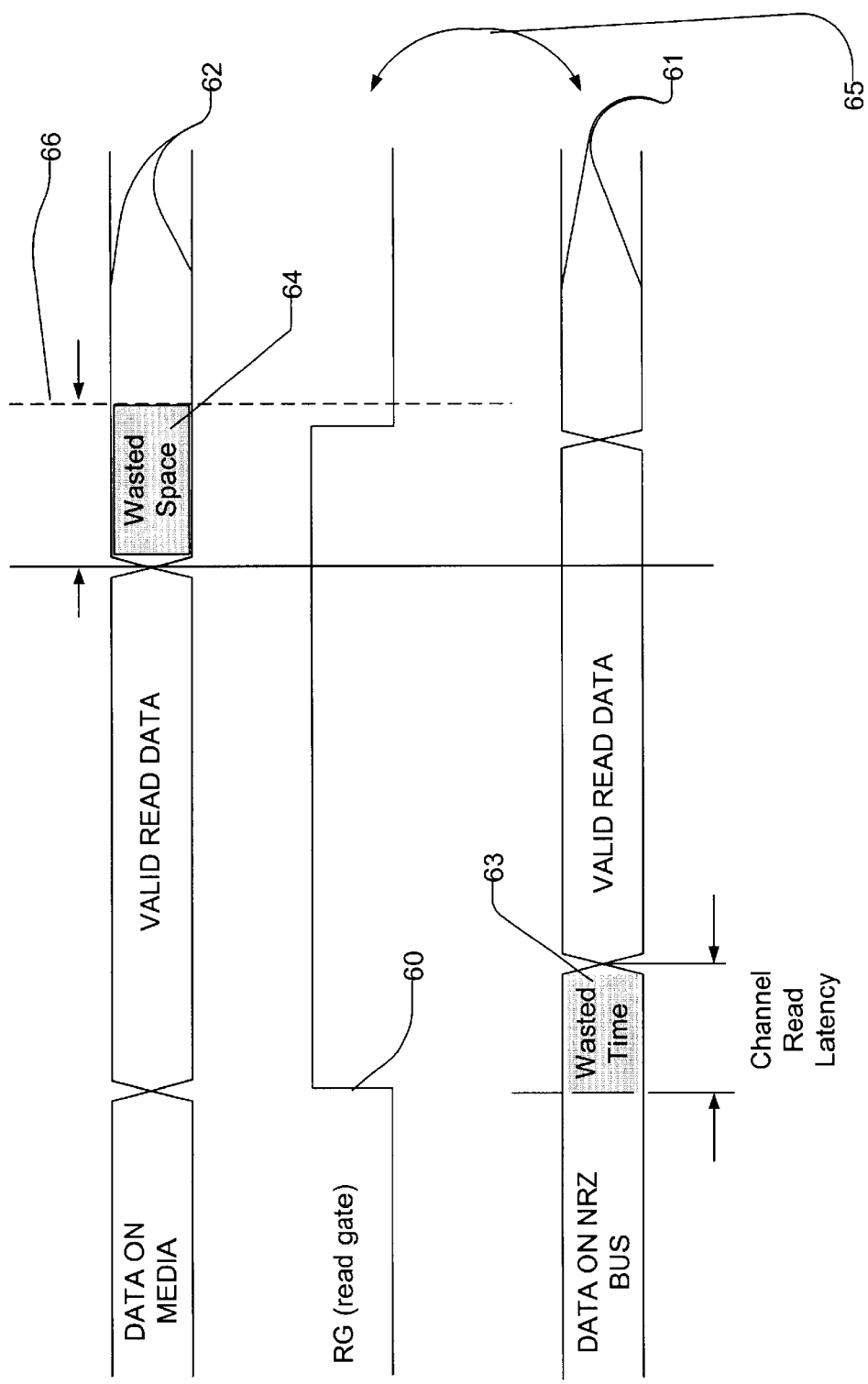
FIG. 5 is a schematic diagram illustrating how the timing relationship between the control path and the data path signal waveforms for read operations used in prior art, caused wasted space and time due to channel latencies.

For example historically, read latencies have been measured in terms of "byte times". A byte time refers to the number of periods transpired by the read reference clock that synchronizes the interface between the disk formatter and the read channel. In the past prior art systems, read channels contained both read and write latencies, which measured an average of less than or equal to 10 byte times. Present generation read channels contain write latencies measured in the range of 10–20 bytes and read latencies measured in the range of 10–70 byte times. Future generation read channels will be employing new encoding/decoding techniques (such as iterative coding) which will produce latencies that are at least an order of magnitude greater than present art channels (e.g., greater than 1000 byte times for write operations and greater than 3000 byte times for read operations). As illustrated in FIG. 5 (63, 64) and FIG. 7 (73, 76), when channel latencies increase in their duration, the data transfer system is subjected to an increase in wasted time and an increase in wasted storage space.

Note that channel latencies, and the wasted storage space associated with them, have existed in prior art implementations of disk formatter and read channel interfaces, however, the issue of wasted bytes (e.g., wasted storage space) was not considered significant, because the previous art contained channel latencies which were not considered large. The next generation of channel technology is expected to employ new data encoding/decoding techniques and post processing schemes (such as iterative coding), which will bring channel latencies that are significant. Therefore the present invention implements a change in disk formatter architecture in order to compensate for these larger latencies.

In order to accommodate large channel latencies, and thereby increase disk storage efficiencies, an architectural shift in the data path interface between traditional controllers and read channels is employed by the present invention. According to one aspect of the present invention, a dual sequencer is employed within the disk formatter logic. By using a dual sequencer disk formatter, the functions of control path responsibilities and data path responsibilities are separated. In other words, the tasks of the control signal timing (read/write gate signals and data location) are isolated from the task of moving data over the NRZ bus. With this approach the disk formatter accommodates channel latencies of virtually any size without a loss in disk efficiency (i.e., no wasted media storage space).

Figure 8:
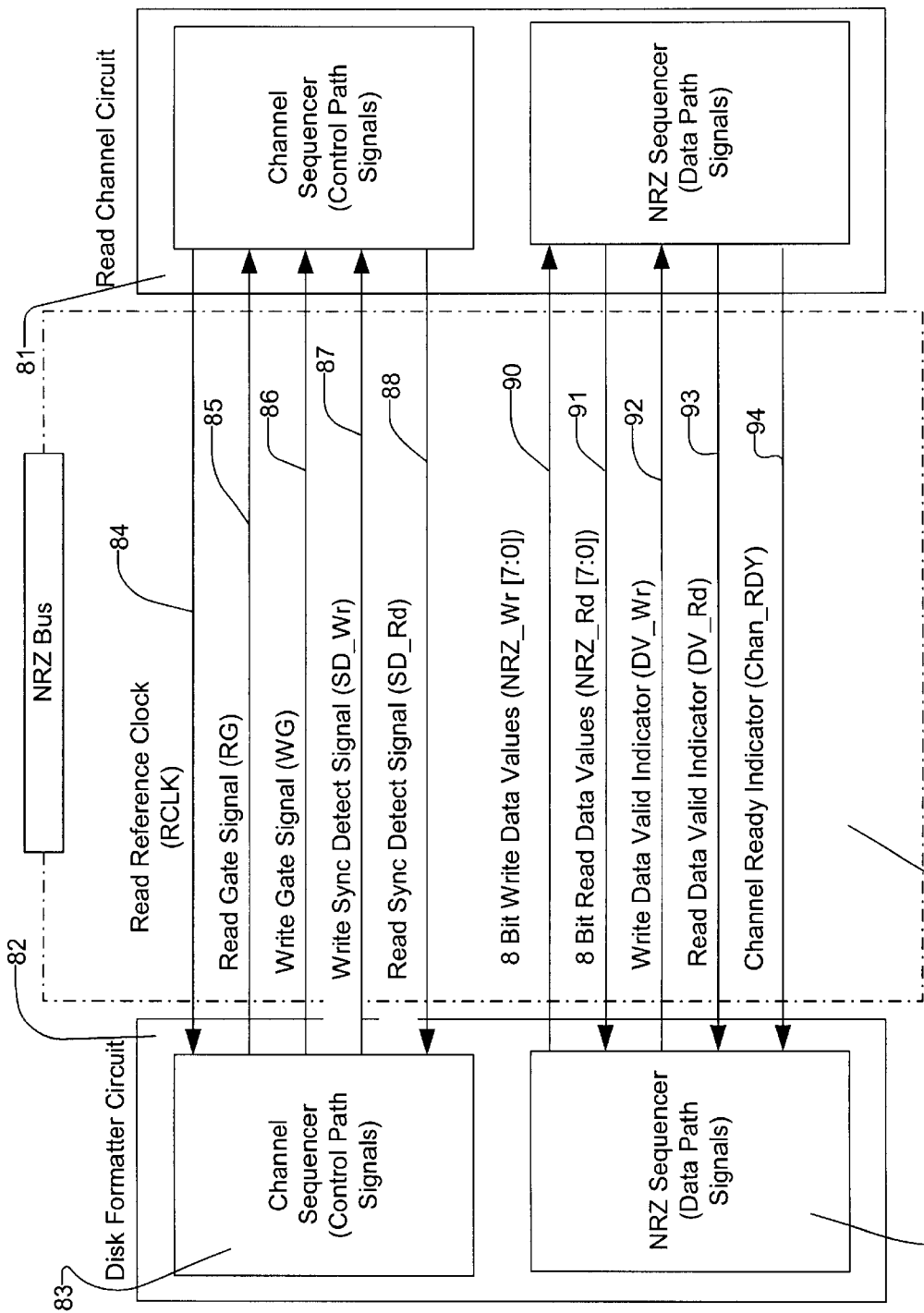
FIG. 8 is a block diagram illustrating a dual sequencer architecture for a disk formatter circuit having independent control path signals and data path signals according to the present invention.

FIG. 8 illustrates the respective control and data paths along the NRZ bus 80, which is located between the disk formatter circuit 82 and the read channel circuit 81 according to one exemplary aspect of the present invention. In the system of FIG. 8, the disk formatter 82 comprises two sequencers, a channel sequencer 83 and an NRZ sequencer 89. According to the present invention, the channel sequencer implements the timing for the control path signals for the read and write operations, while the NRZ sequencer 89 provides the timing and control for the data path signals. In addition, the timing provided by the two sequencers are independent of one another; consequently the control path signals are decoupled from the data path signals. Such decoupling enables the present invention to accommodate substantial read channel latencies without the wasted space and time inefficiencies described above in conjunction with the prior art.

The control path signals associated with the channel sequencer 83 consist of a read reference clock (RCLK) 84, a read gate signal (RG) 85, a write gate signal (WG) 86, a write sync detect signal (SD_Wr) 87, and a read sync detect signal (SD_Rd) 88. In addition, the data path signals of the NRZ sequencer 89 consist of an 8 bit write data values (NRZ_Wr [7:0]) signal 90, an 8 bit read data values (NRZ_Rd [7:0]) 91, a write data valid indicator (DV_Wr) 92, a read data valid indicator (DV_Rd) 93, and a channel ready indicator (Chan_RDY) 94.

Figure 9:
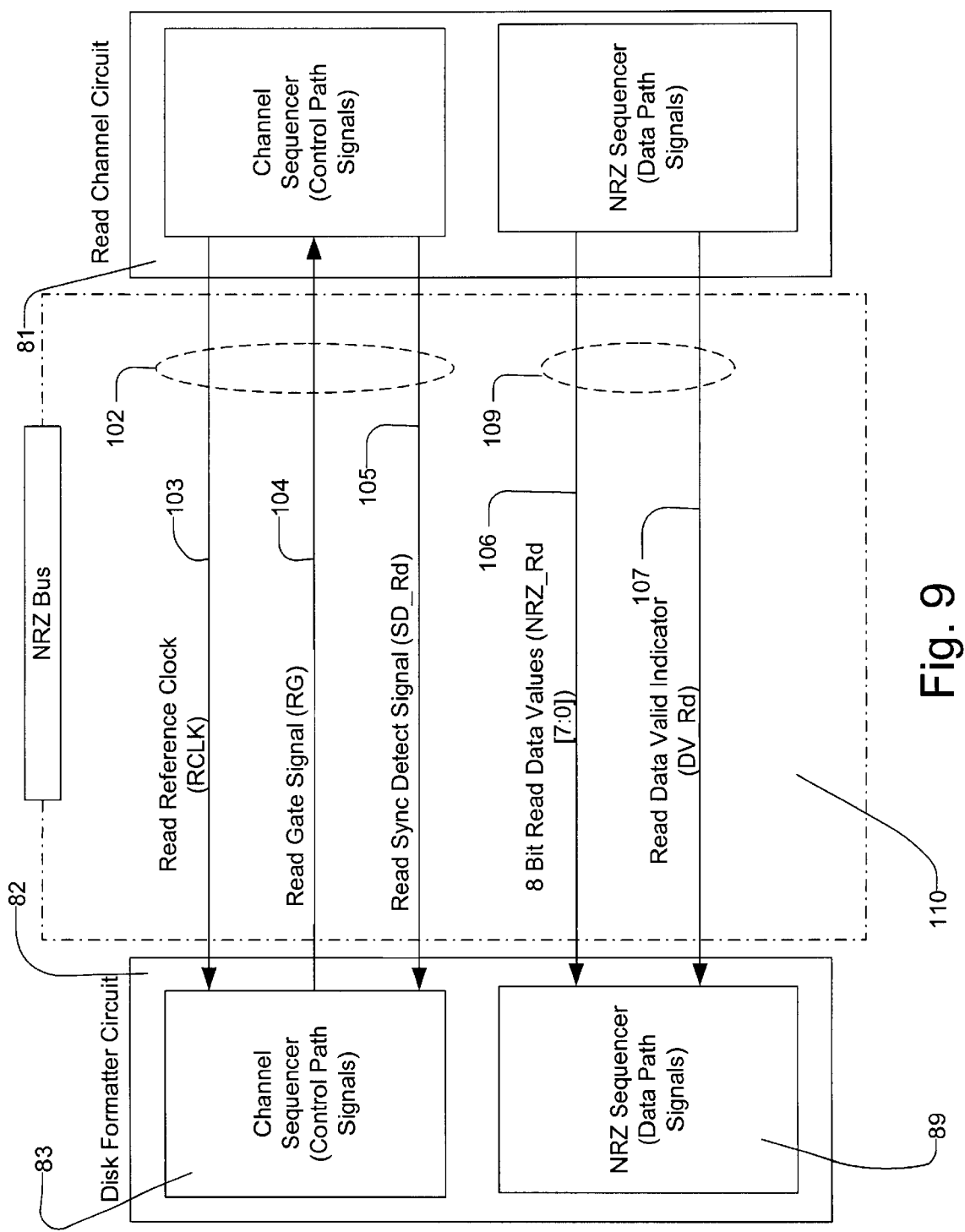
FIG. 9 is a block diagram illustrating the read operation control and data signal paths between the dual sequencer disk formatter circuit and the read channel circuit according to the present invention.

FIG. 9 illustrates the respective control and data path signals along the NRZ bus 110 between a dual sequencer disk formatter circuit 82 and a read channel circuit 81 for a read operation according to one exemplary aspect of the present invention. The control path signals 102 associated with the channel sequencer 83 are described first. The read reference clock (RCLK) 103 signal is a signal generated from the read channel 81 and received by the disk formatter 82. The read reference clock (RCLK) 103 signal is a byte clock generated by the read channel and is used for timing purposes. The read gate control signal (RG) 104, is generated by the disk formatter 82, and is synchronous to the read reference clock 103. The read gate control signal (RG) 104 originates with the channel sequencer 83 lets the read channel 81 know when a data read operation is to occur. The read sync detect control signal (SD-Rd) 105 is generated by the read channel 81 and is synchronous to the read reference clock 103. The read sync detect control signal (SD-Rd) 105 is active high for one read reference clock cycle 103; on read operations this signal is pulsed high by the read channel 81. The read sync detect control signal (SD-Rd) 105 provides information to the disk formatter 82 regarding the timing of a detected sync pattern on the media. The read channel delay, from when the sync is detected on the media to when this output is pulsed, is desirably minimal and constant.

Next the data path signals 109 of FIG. 9 are described. An 8-bit read data values (NRZ-Rd [7:0]) signal 106 is a signal going from the read channel 81 to the disk formatter 82. Data values on this bus are synchronous to the read reference clock 103. The read data valid indicator signal (DV_Rd) 107 is a signal going from the read channel 81 to the disk formatter 82. This signal 107 is synchronous to the read reference clock 103 and is active high. When high, the data values on the NRZ_Rd bus 106 are valid on the rising edge of the read reference clock 103 signal.

Figure 10:
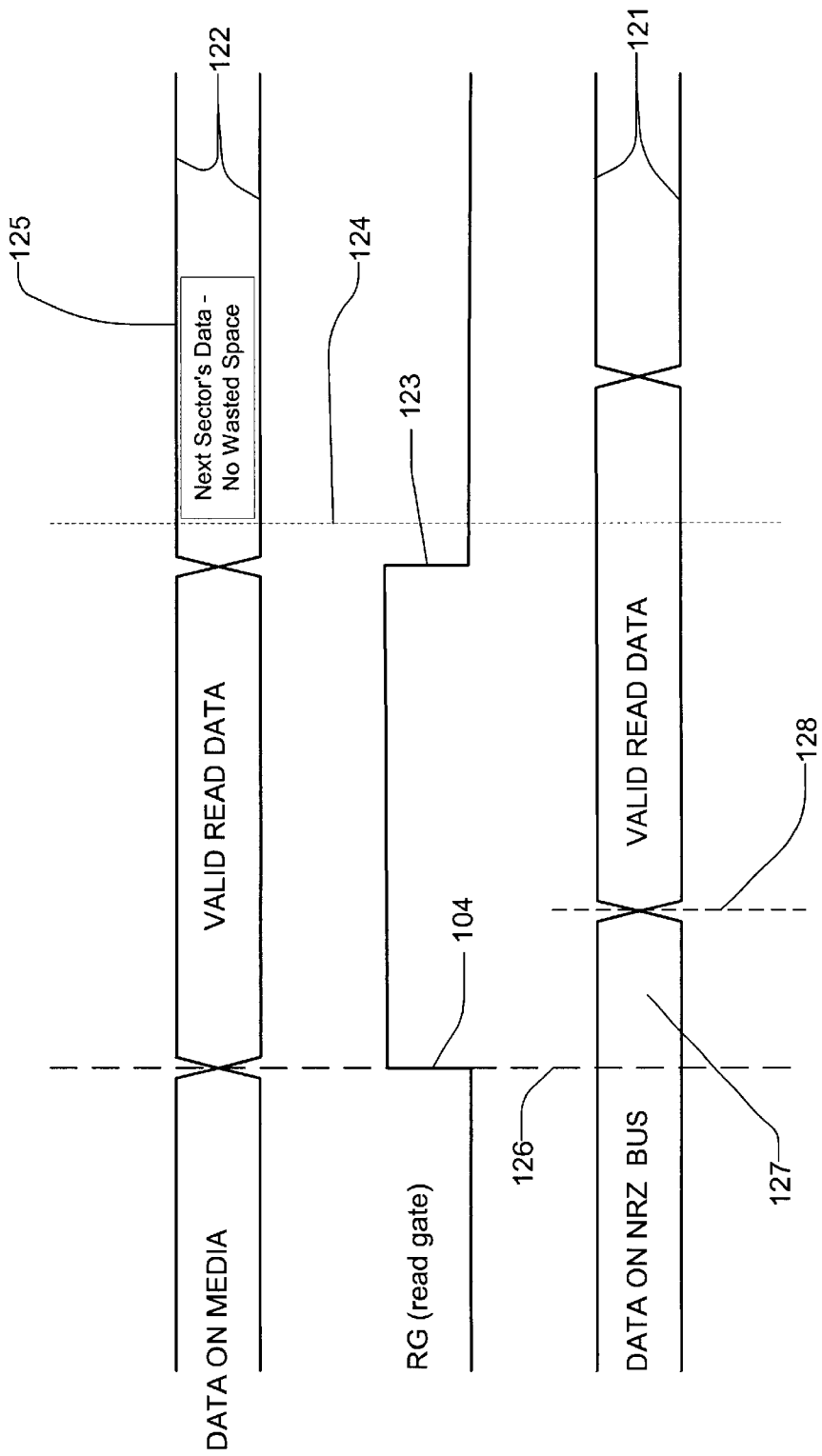
FIG. 10 is a schematic diagram illustrating how the independent timing relationship between the control path and data path signal waveforms for read operations using the dual sequencer of the present invention overcomes the disadvantages of the prior art with regard to channel latencies.

FIG. 10 illustrates a subset of the waveforms involved with a read operation. One sequencer (the channel sequencer 83) controls the timing of the data, as presented on the media 122, and controls the read gate signal 104. A second sequencer (the NRZ sequencer 89) is tied to the timing of the data transfer across the NRZ bus 121. In other words one sequencer 83 is used to identify the data and determines the length of the data to be transferred. The other sequencer 89 is dedicated to decoding/encoding operations, indicates when the data has transferred, and any other data validation responsibilities.

The read gate signal 104 is generated when data is required to be accessed, and is available, from the storage media 122. After this data is obtained and in the read channel 81 undergoing processing for subsequent transmission to the disk formatter on the NRZ bus the read gate signal 104 goes low at 123 and the system is ready to proceed with transferring the next sector of data from the media 122. The next section of data can be transferred at 124 (the next RCLK after RG 104 went low) since the second sequencer 89 handles data transmission on the NRZ bus after the read channel validation responsibilities. Note that the storage media 122 contains substantially no wasted storage space 125 despite the channel read latency because the control path signal 104 is free to immediately act on the control path responsibilities and does not have to address data path responsibilities (since the second sequencer 89 handles data path responsibilities). In addition there is no wasted time because the system is ready to start retrieving the data at 126 without waiting for the completion of the data validation process at 128 of the previous sector's data 127. In other words the system can start processing (e.g., finding and determining the length of data) the next sector's data without waiting for the previous data validation (encoded/decoded, etc.) to be completed and moved to the NRZ data bus 121. It should be noted that the system can now handle channel latencies of any size and multiple sector times because it does not depend on all tasks (e.g., data validation) being completed in order to commence a new task (e.g., data acquirement).

Figure 11:
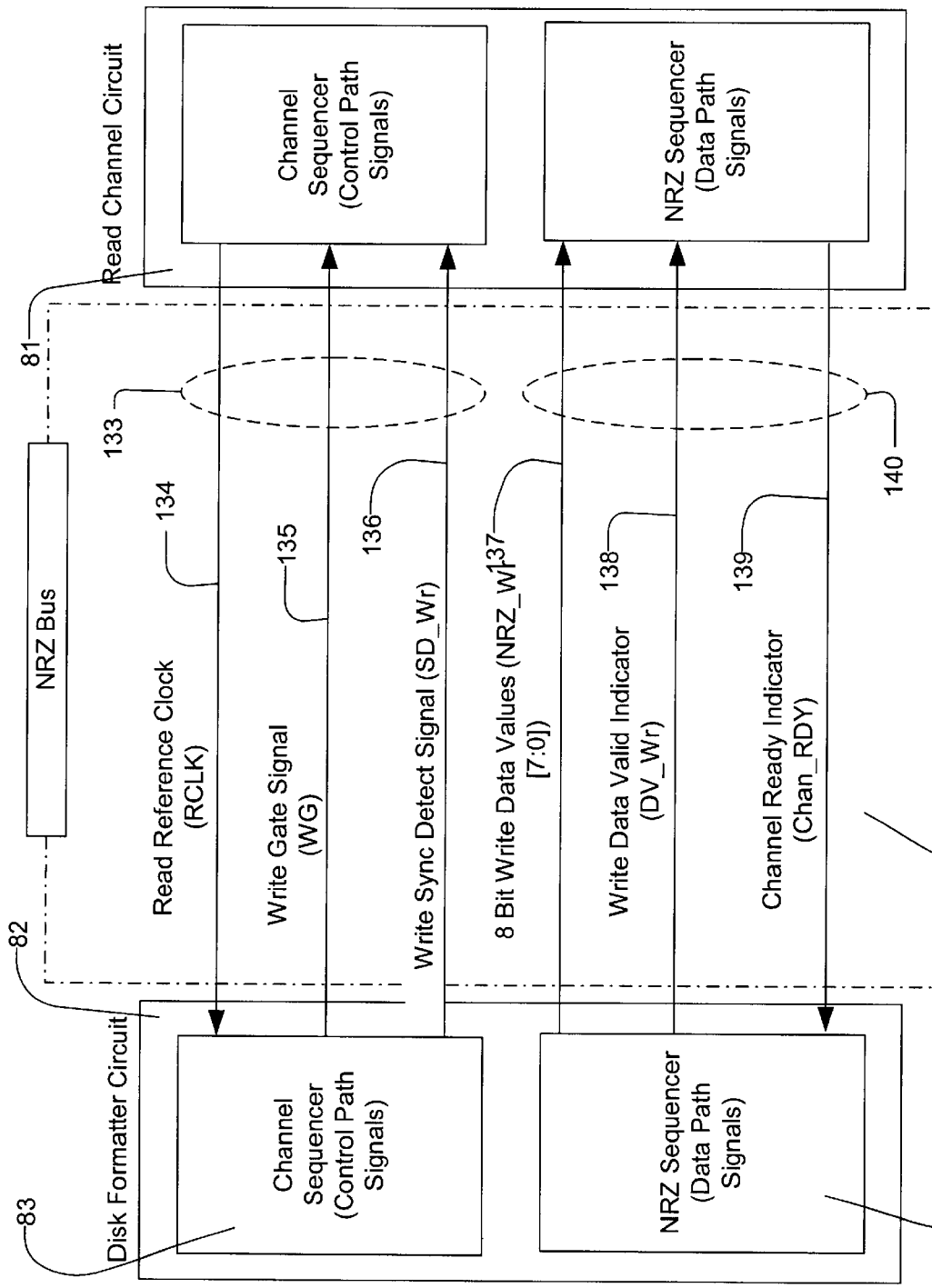
FIG. 11 is a block diagram illustrating the write operation control and data signal paths between the dual sequencer disk formatter circuit and the read channel circuit according to the present invention.

FIG. 11 illustrates the respective control and data paths along the NRZ bus 110 located between the dual sequencer disk formatter circuit 82 and the read channel circuit 81 for write operations according to one exemplary aspect of the present invention. The control path signals 133 are described first. The read reference clock (RCLK) 134 is a signal going from the read channel 81 to the disk formatter 82. This signal is a byte clock generated by the read channel and is used for timing purposes. The write gate control signal (WG) 135 is generated by the channel sequencer 83 of the disk formatter 82, and is synchronous to the read reference clock 134; the write gate control signal (WG) 135 lets the system know when data transfer operations are to occur. The write sync detect control signal (SD_Wr) 136 is generated by the channel sequencer 83 of the disk formatter 132 and is synchronous to the read reference clock 134. The write sync detect control signal (SD_Wr) 136 is active high for one read reference clock cycle 134. On write operations the signal 136 is pulsed high by the disk formatter 132 to indicate to the read channel 81 the timing of when to write the sync pattern followed by the encoded user data. The read channel delay, from when this input is pulsed to when the sync pattern is written on the media is desirably minimal and constant.

Next the data path signals 140 are described. The 8-bit write data values (NRZ_Wr [7:0]) signal 137 is a signal going from the disk formatter 83 to the read channel 81. Data values on this bus are synchronous to the read reference clock 134. The write data valid indicator (DV_Wr) 138 is a signal going from the disk formatter 83 to the read channel 81, is synchronous to the read reference clock 134, and is active high. When high, the data values on the NRZ_Wr bus 137 will be valid on the rising edge of the read reference clock 134 signal.

Figure 12:
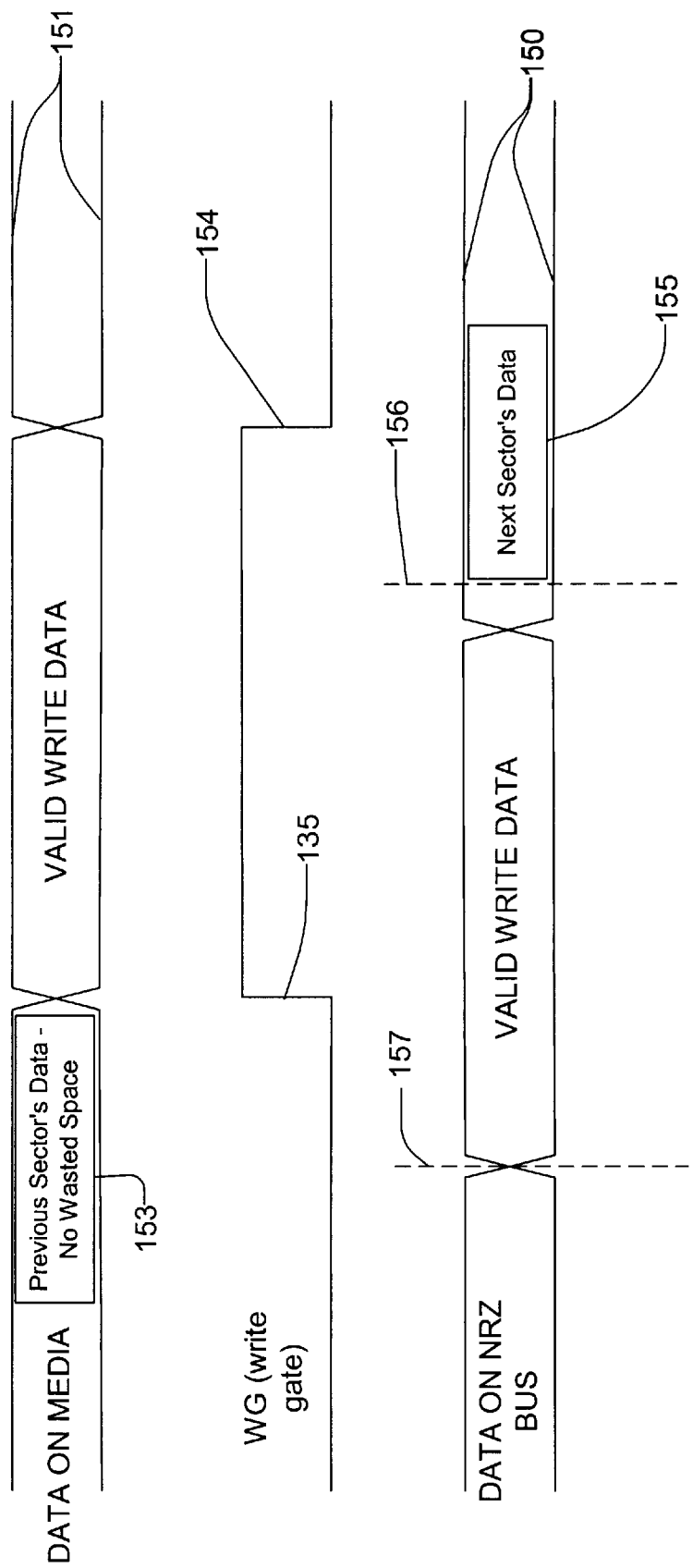
FIG. 12 is a schematic diagram illustrating how the independent timing relationship between the control path and data path signal waveforms for write operations using the dual sequencer of the present invention overcomes the disadvantages of the prior art with regard to channel latencies.

FIG. 12 illustrates the waveforms involved with this process. One sequencer (the channel sequencer 83) is tied to the timing 151 of the storage media disk (also called the media) and controls the write gate signal 135. The other sequencer (the NRZ sequencer 89) dictates the timing 150 of the data transfer across the NRZ bus. In other words, one sequencer is used to determine the type of data and data length to be transferred, and the other sequencer is used for decoding/encoding operations and other data validation responsibilities.

Data to be written to the media is sent to the NRZ bus by the NRZ sequencer 89 as illustrated at 157 of FIG. 12 for encoding by the read channel 81. The channel sequencer 83 determines the data length to be written and generates the write gate signal 135. Since the data at the read channel 81 is already validated, the transfer to the storage media can commence immediately after the write gate signal is generated, as illustrated in FIG. 12.

When the data path portion 150 of the system completes the data transfer to the read channel 81, the system is free to obtain new data at 156 for subsequent write operation (because the data path operates with a separate sequencer). Meanwhile the original set of data is still in the process of being written onto the storage media 151. This process will continue until the write gate signal goes low at 154. The system is now ready to store the next encoded data sector from the read channel 81 to the storage media 151. In other words since both the control path and the data path have their own sequencers that operate independently of one another, the data path signal does not have to wait (in order to commence its validation process) for the control path to finish the process of writing data to the storage media. A result of this invention is substantially no wasted storage space 153 on the storage media 151. In addition there is substantially no wasted time because the system does not have to wait for the data storage process to be completed (e.g., write gate signal cleared) 154 in order to commence transferring the next sector of data 155 for encoding (validation) at the read channel 81.

Figure 1:
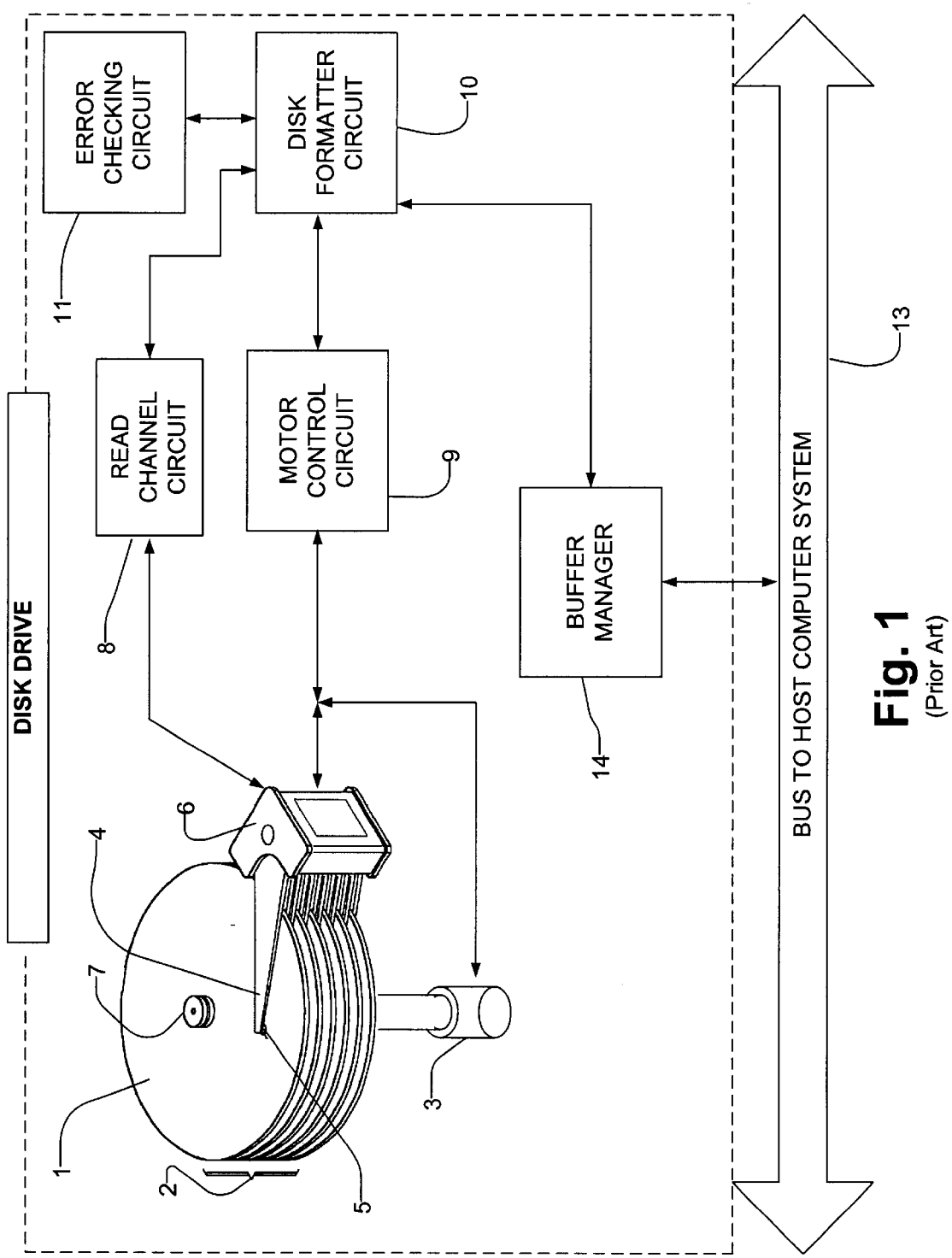
FIG. 1 is a block diagram illustrating a hard disk drive system circuit including the interface between internal logic systems.
Figure 2:
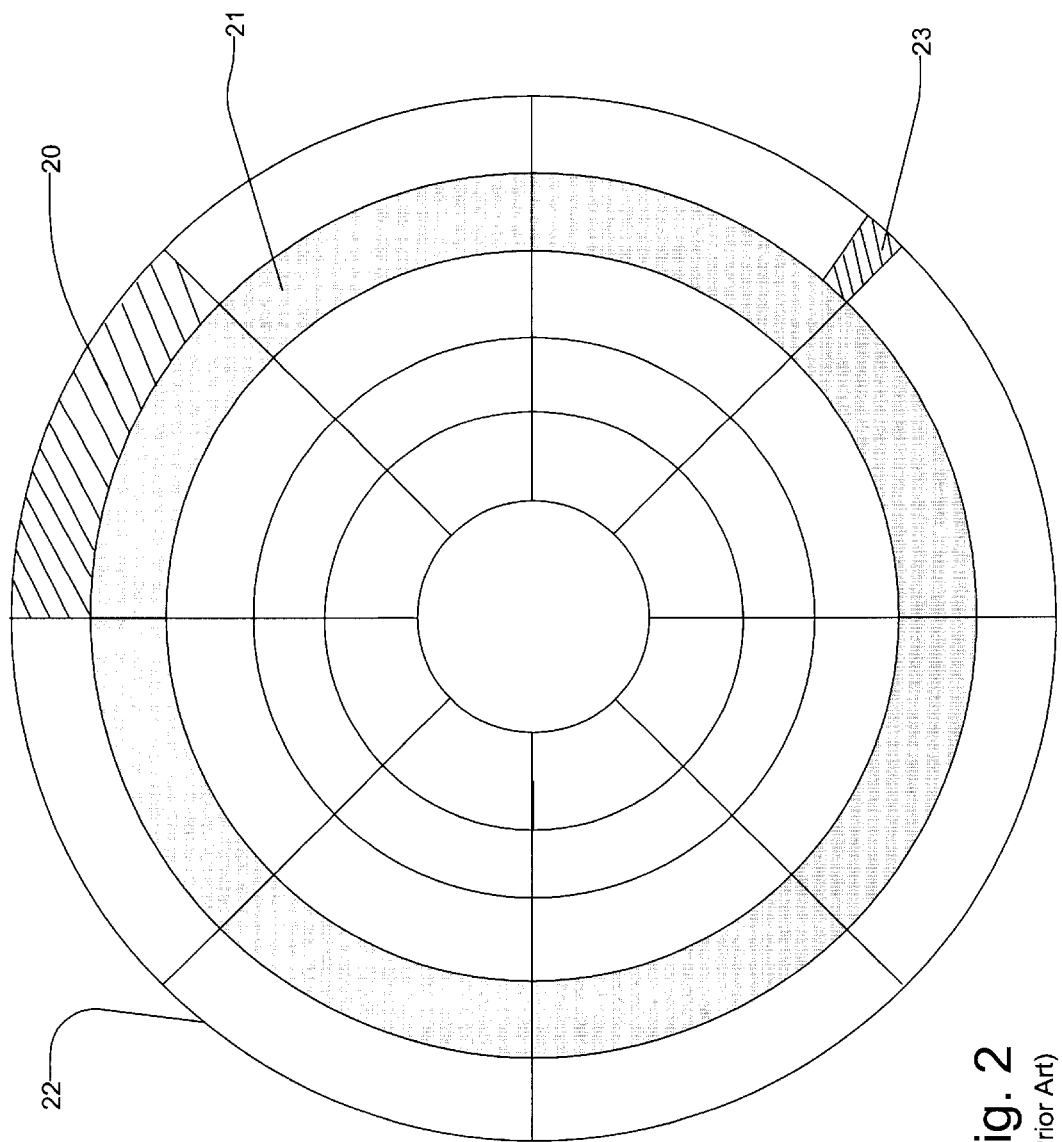
FIG. 2 is a plan view of a storage platter illustrating a typical storage disk data arrangement.

Another benefit of the dual sequencer approach is the simpler logic required to identify the data which is being transferred. In other words the protocol between the channel and the controller is simplified and allows for data transfers with multiple sector times. A servo location provides data location information in the form of sync bytes to the system FIG. 2 23, however these bytes 23 are not a function of the data content. In prior art since one sequencer handled data path and control path responsibilities the sync bytes and data valid signals were dependent on each other. The sync byte was embedded in the data and therefore prior art would wait until all the data was collected, then determine if the data was valid and then process the data (including the sync bytes 23).

Figure 13:
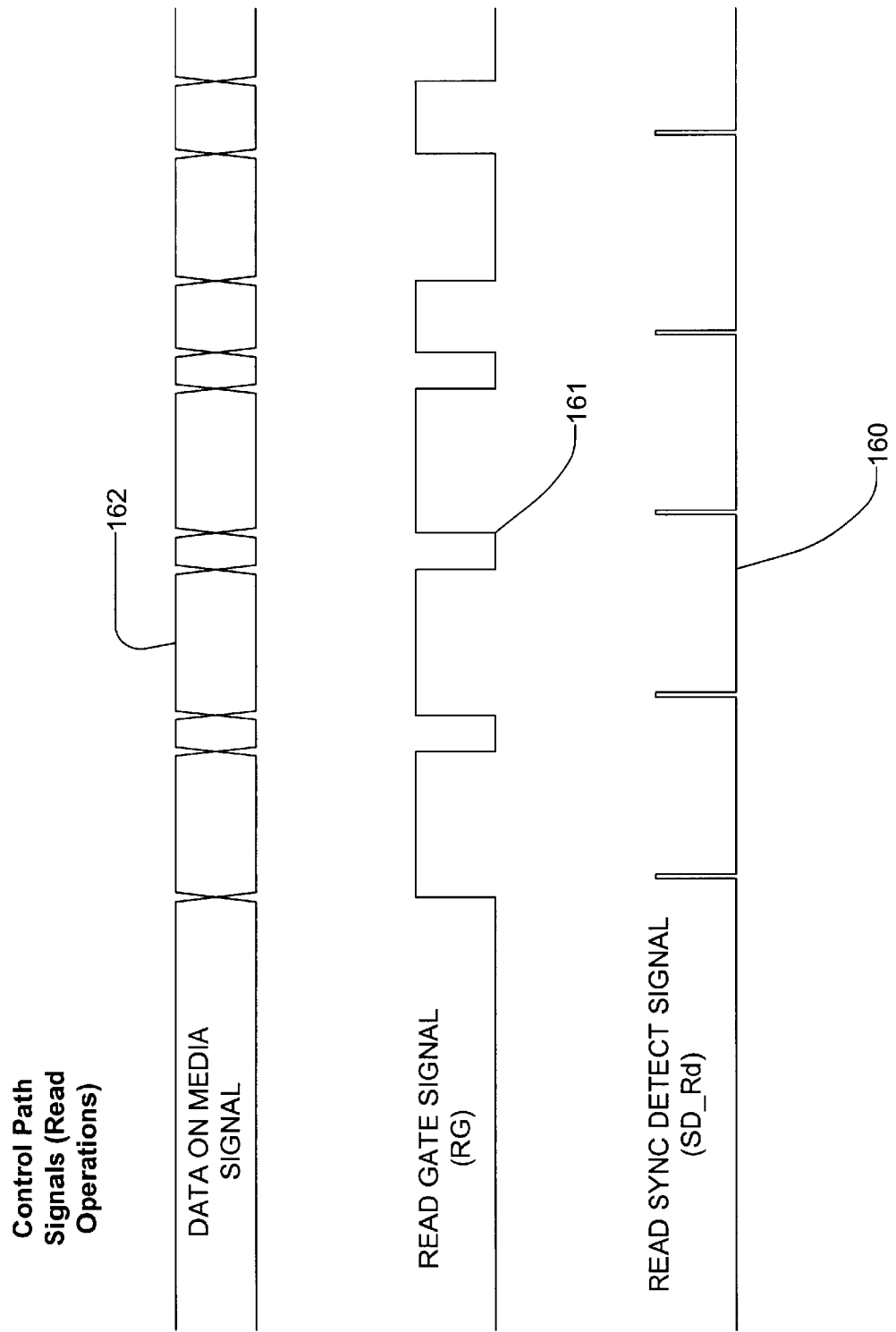
FIG. 13 is a schematic diagram illustrating the timing relationships between the control path signals for read operations using the dual sequencer of the present invention, which highlights the protocol used in the interface logic.

Quite often, if there was not enough room in a sector for the data information to be stored, the data sectors were presented on the storage media in the form of a split. Splits are media related and allow sectors FIG. 2 20 to straddle a servo location (on the media). In the past prior art systems would wait until all of the data could be identified, validated, collected, etc. prior to any data transfers, however, since the dual sequencer of the present invention isolates the responsibilities of the control path from the data path and only the control path (FIG. 13) needs to know about media information 162 the logic identifying the data is simplified.

Figure 14:
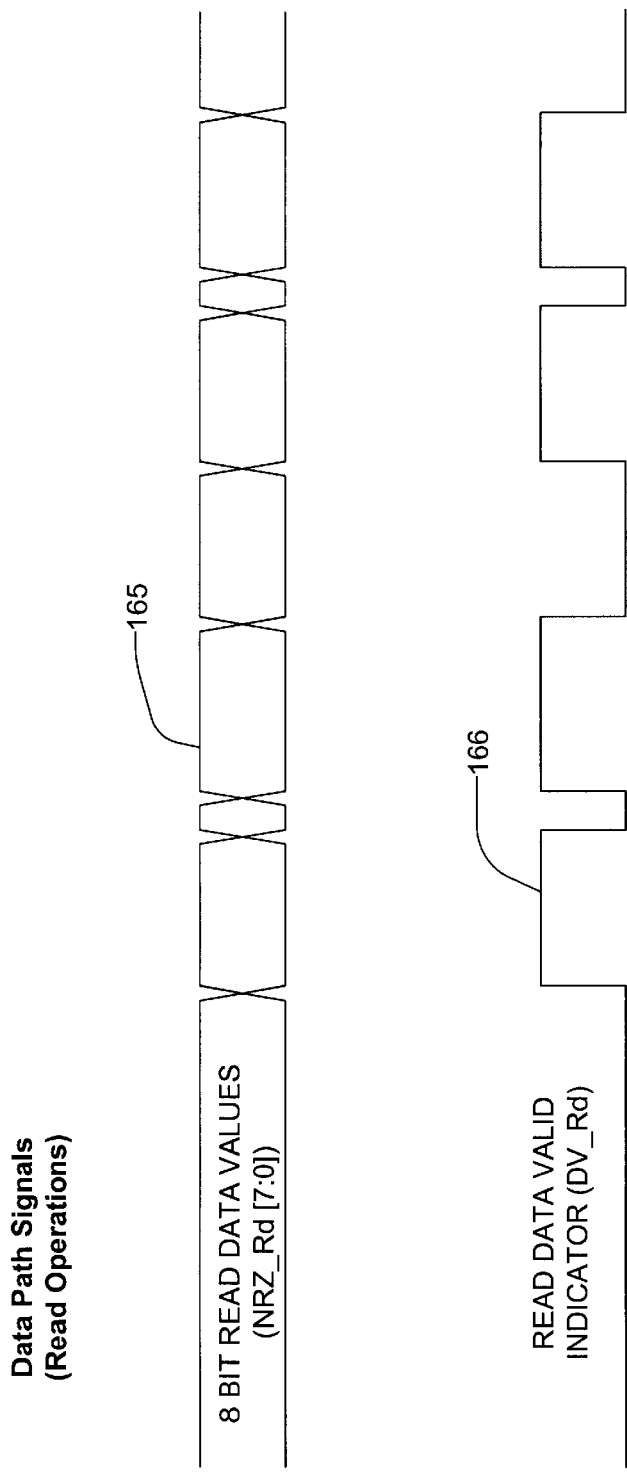
FIG. 14 is a schematic diagram illustrating the timing relationships between the data path signals for read operations using the dual sequencer of the present invention, which highlights the protocol used in the interface logic.

For read operations this is performed via the read sync detect signal (SD_Rd) 160. The read sync detect signal (SD_Rd) 160 provides only media 162 location information allowing the read gate 161 to address timing issues involved with the buffer manager, etc. The data path (FIG. 14) then is free to transfer data to the 8 Bit read data Values (NRZ_Rd [7:0]) 165 after the data is validated via the read data Valid Indicator (DV_Rd) signal 166.

Figure 15:
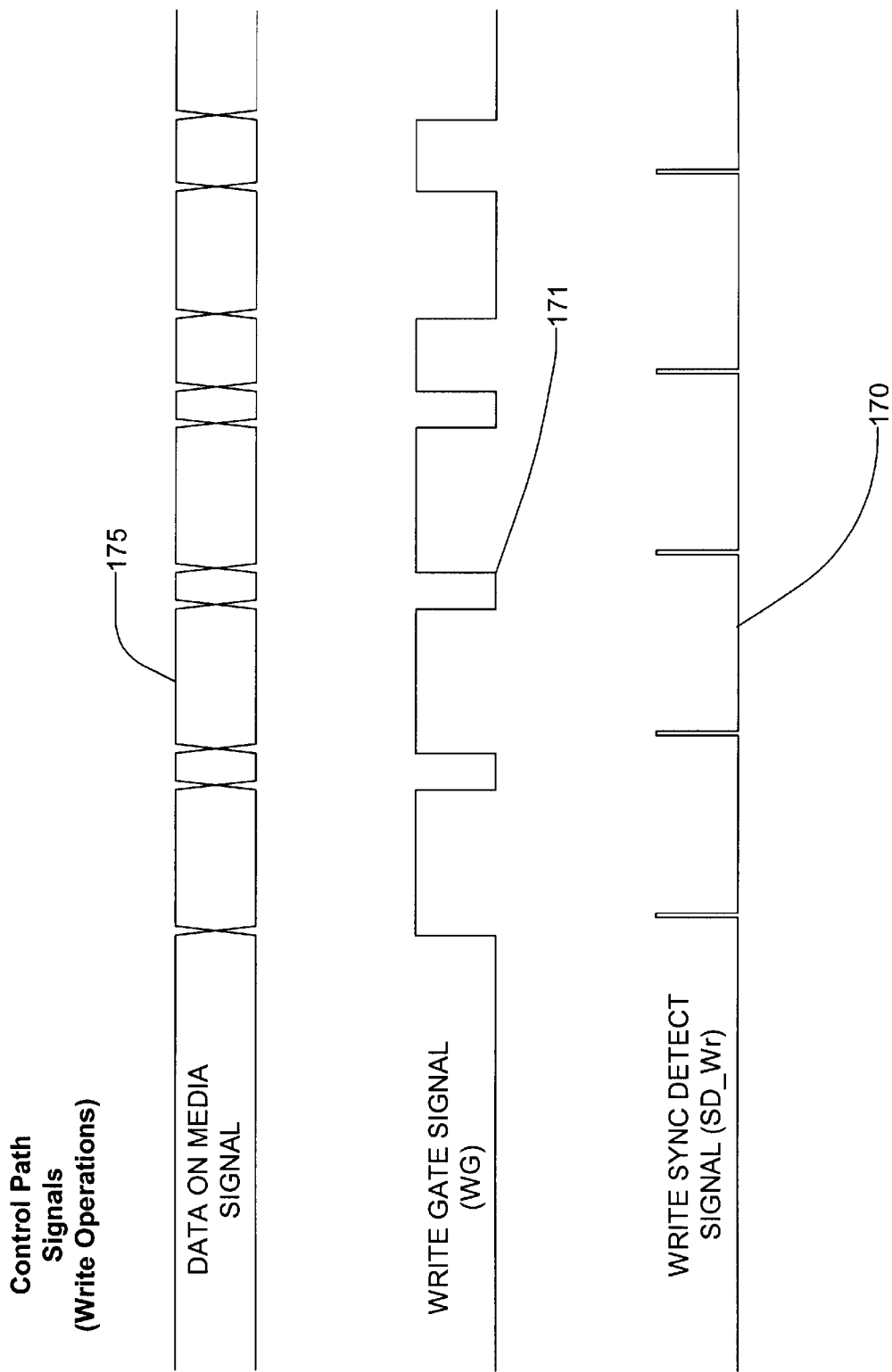
FIG. 15 is a schematic diagram illustrating the timing relationships between the control path signals for write operations using the dual sequencer of the present invention, which highlights the protocol used in the interface logic.
Figure 16:
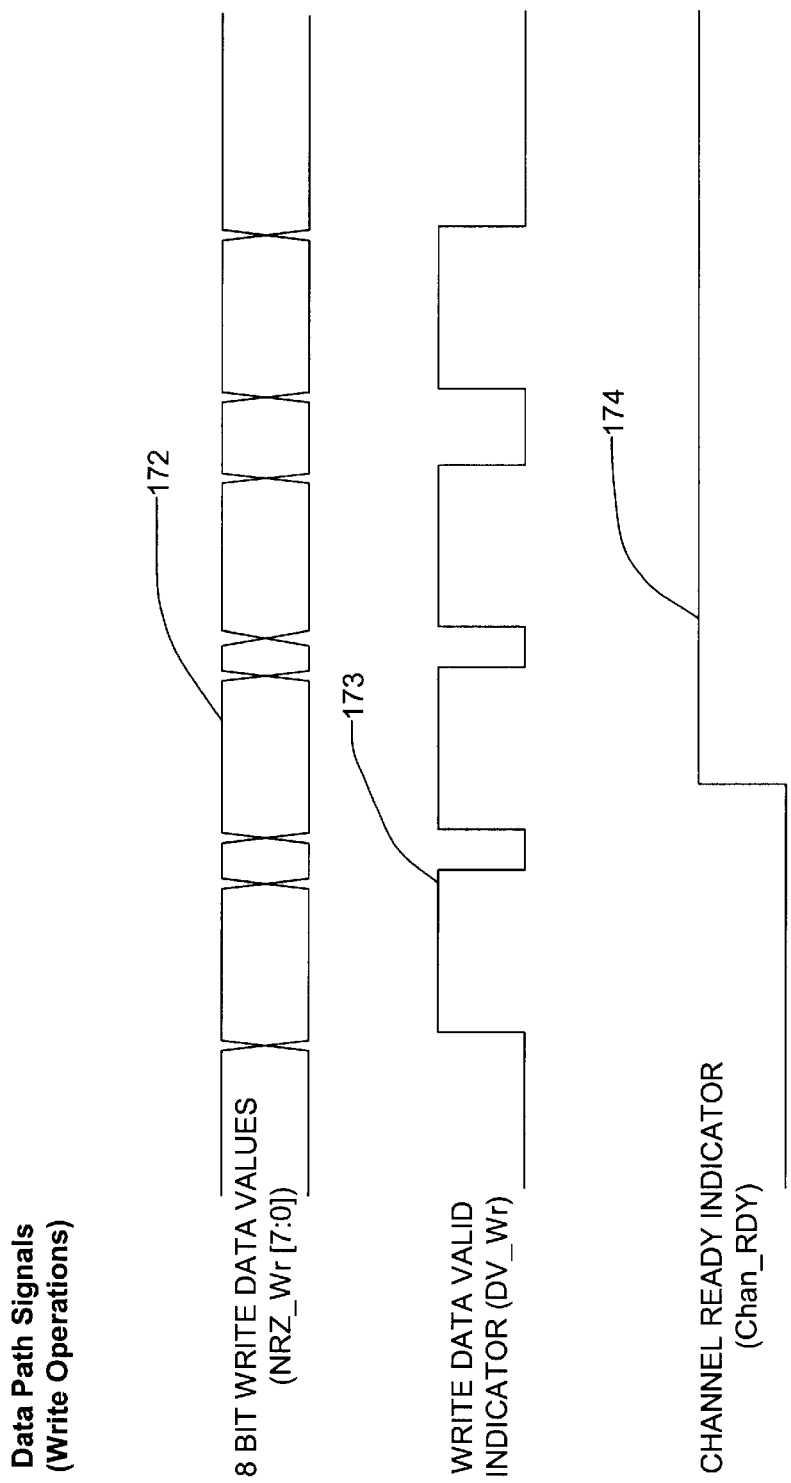
FIG. 16 is a schematic diagram illustrating the timing relationships between the data path signals for write operations using the dual sequencer of the present invention, which highlights the protocol used in the interface logic.

For write operations the write sync detect signal (SD_Wr) FIG. 15 170 provides location information allowing the write gate 171 to address timing issues involved with the buffer manager, etc. The data path (FIG. 16) is free to transfer data from the 8 Bit write data Values (NRZ_Wr [7:0]) 172 after the data is validated via the write data Valid Indicator (DV_Wr) 173 signal. The Chan_RDY 174 signal indicates to the formatter that data from the buffer is encoded and the read channel is ready to write data to the media 175 whenever a write gate 171 is asserted.

As previously noted, this greatly simplifies the logic involved with data identification. Please note that newer encoding\decoding techniques require entire sectors of data be presented at the read channel, which the dual sequencer of the present invention provides with no wasted storage space on the media, no wasted time waiting for the disk formatter/read channel interface and no need to process sync bytes as data (only locators of data).

Although the invention has been shown and described with respect to a certain implementation or implementations, it will be appreciated by those skilled in the art that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several implementations or applications of the invention, such feature may be combined with one or more other features of the other implementations as may be desired and advantageous for any given or particular application. Furthermore, to the extent that the term, "includes", "has", "having", and/or variants thereof are used in either the detailed description or the claims, such terms are intended to be inclusive in a manner similar to the terms "comprises" and "comprising".

What is claimed is:

1. A hard disk drive system comprising:
   a hard disk drive media operable to store data thereon;
   a read/write head operable to read data from the media and write data to the media based read/write control signals;
   a preamplifier circuit operable to amplify an analog signal from the read/write head during read operation;
   a read channel circuit operably coupled to the preamplifier circuit and operable to convert the analog signal to digital data and decode the digital data for error correction;
   a disk controller circuit operably coupled between a system bus and the read channel circuit, the disk controller comprising a disk formatter circuit, wherein the disk formatter circuit further comprises:
      a channel sequencer circuit operable to coordinate one or more control path signals between the disk formatter circuit and the read channel circuit; and
      an Non Return Zero (NRZ) sequencer circuit operable to coordinate one or more data path signals between the disk formatter circuit and the read channel circuit,
      wherein a timing of the control path signals is independent of a timing of the data path signals, thereby substantially reducing wasted space on the media associated with a read channel latency.

2. The hard disk drive system of claim 1, wherein the control path signals associated with the channel sequencer circuit comprises a read gate signal which is generated by the channel sequencer circuit and transmitted to the read channel circuit, and wherein the read gate signal is operable to indicate when data is available to be read from the media during a read operation.

3. The hard disk drive system of claim 2, wherein a duration of an asserted portion of the read gate signal is associated with an amount of data to be read from the media.

4. The hard disk drive system of claim 2, wherein the data path signals associated with the NRZ sequencer circuit comprise an NRZ_Rd signal which is operable to indicate to the NRZ sequencer circuit that the data retrieved from the media is ready for transmission from the read channel circuit to the disk formatter circuit.

5. The hard drive system of claim 4, wherein the NRZ_Rd signal comprises a multi-bit stream of data values representing the retrieved data having a timing associated with when the read channel circuit has completed a decoding thereof.

6. The hard disk drive system of claim 5, wherein a timing of the NRZ_Rd signal is independent of a timing of the read gate signal, thereby allowing a next sector of data to be retrieved in conjunction with the read gate signal independently of whether the retrieved data has completed decoding by the read channel circuit and been transferred to the disk formatter circuit.

7. A hard disk drive system comprising:
   a hard disk drive media operable to store data thereon;
   a read/write head operable to read data from the media and write data to the media based read/write control signals;
   a read channel circuit operably coupled a preamplifier circuit and operable to convert the digital data signal to an analog signal and encode the data for media storage;
   a disk controller circuit operably coupled between a system bus and the read channel circuit, the disk controller comprising a disk formatter circuit, wherein the disk formatter circuit further comprises:
      a channel sequencer circuit operable to coordinate one or more control path signals between the disk formatter circuit and the read channel circuit; and
      an Non Return Zero (NRZ) sequencer circuit operable to coordinate one or more data path signals between the disk formatter circuit and the read channel circuit,
      wherein a timing of the control path signals is independent of a timing of the data path signals, thereby substantially reducing wasted space on the media associated with a write channel latency.

8. The hard disk drive system of claim 7, wherein the control path signals associated with the channel sequencer circuit comprises a write gate signal which is generated by the channel sequencer circuit and transmitted to the read channel circuit and wherein the write gate signal is operable to indicate when data is available to be written to the media during a write operation.

9. The hard disk drive system of claim 8, wherein a duration of an asserted portion of the write gate signal is associated with an amount of data to be written to the media.

10. The hard disk drive system of claim 8, wherein the data path signals associated with the NRZ sequencer circuit comprise an NRZ_Wr signal which is operable to indicate to the NRZ sequencer circuit that data is ready to be transmitted from the disk formatter circuit to the read channel circuit for subsequent storage on the media.

11. The hard drive system of claim 10, wherein the NRZ_Wr signal comprises a multi-bit stream of data values representing data to be stored on the media and having a timing associated with when the read channel circuit has completed a encoding thereof.

12. The hard disk drive system of claim 11, wherein a timing of the NRZ_Wr signal is independent of a timing of the write gate signal, thereby allowing a next sector of data to be stored in conjunction with the write gate signal independently of whether the transmitted data has completed encoding by the read channel circuit.

* * * * *